United States Patent [19]

Cowan

[11] Patent Number: 5,167,591
[45] Date of Patent: Dec. 1, 1992

[54] VARIABLE SPEED TRANSMISSION

[76] Inventor: Ben Cowan, 46 Heath Road, Montreal, Quebec, Canada, H3X 3L4

[21] Appl. No.: 808,673

[22] Filed: Dec. 17, 1991

Related U.S. Application Data

[60] Division of Ser. No. 536,738, Jun. 12, 1990, abandoned, which is a continuation-in-part of Ser. No. 388,863, Aug. 3, 1989, abandoned, which is a continuation-in-part of Ser. No. 293,422, Jan. 4, 1989, abandoned.

[30] Foreign Application Priority Data

May 6, 1988 [CA] Canada .................................. 566161

[51] Int. Cl.$^5$ .............................................. F16H 1/28
[52] U.S. Cl. ................................................. 475/211
[58] Field of Search ...................................... 475/211

[56] References Cited

FOREIGN PATENT DOCUMENTS

| 170525 | 2/1952 | Fed. Rep. of Germany | 475/211 |
| 185184 | 4/1956 | Fed. Rep. of Germany | 475/211 |
| 2651629 | 5/1977 | Fed. Rep. of Germany | 475/211 |
| 1-59449 | 6/1990 | Japan | 475/211 |
| 1-63554 | 6/1990 | Japan | 475/211 |
| 689262 | 3/1953 | United Kingdom | 475/211 |

Primary Examiner—Dirk Wright
Attorney, Agent, or Firm—Nixon & Vanderhye

[57] ABSTRACT

By incorporating an infinitely adjustable, variable speed transmission unit into a bicycle driving mechanism, it becomes possible to vary the speed of the bicycle in a very easy and continuous manner from any predetermined maximum value of rotation in the forward direction to zero. By using a similar, infinitely adjustable, variable speed transmission unit in combination with a standard, two speed and reverse gear box, a very efficient automotive transmission system is also achieved, having a stepless speed control with a large power input.

7 Claims, 10 Drawing Sheets

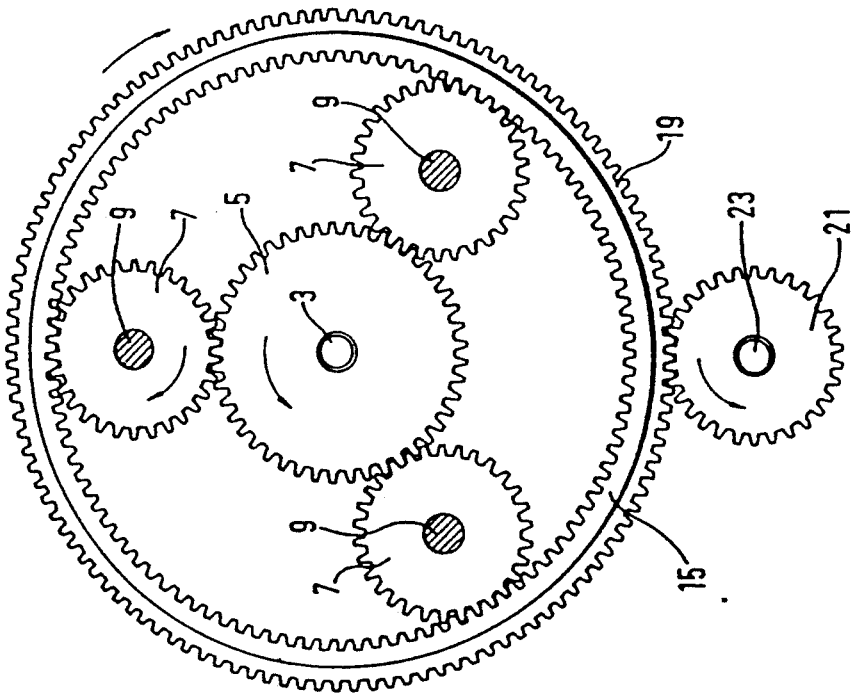
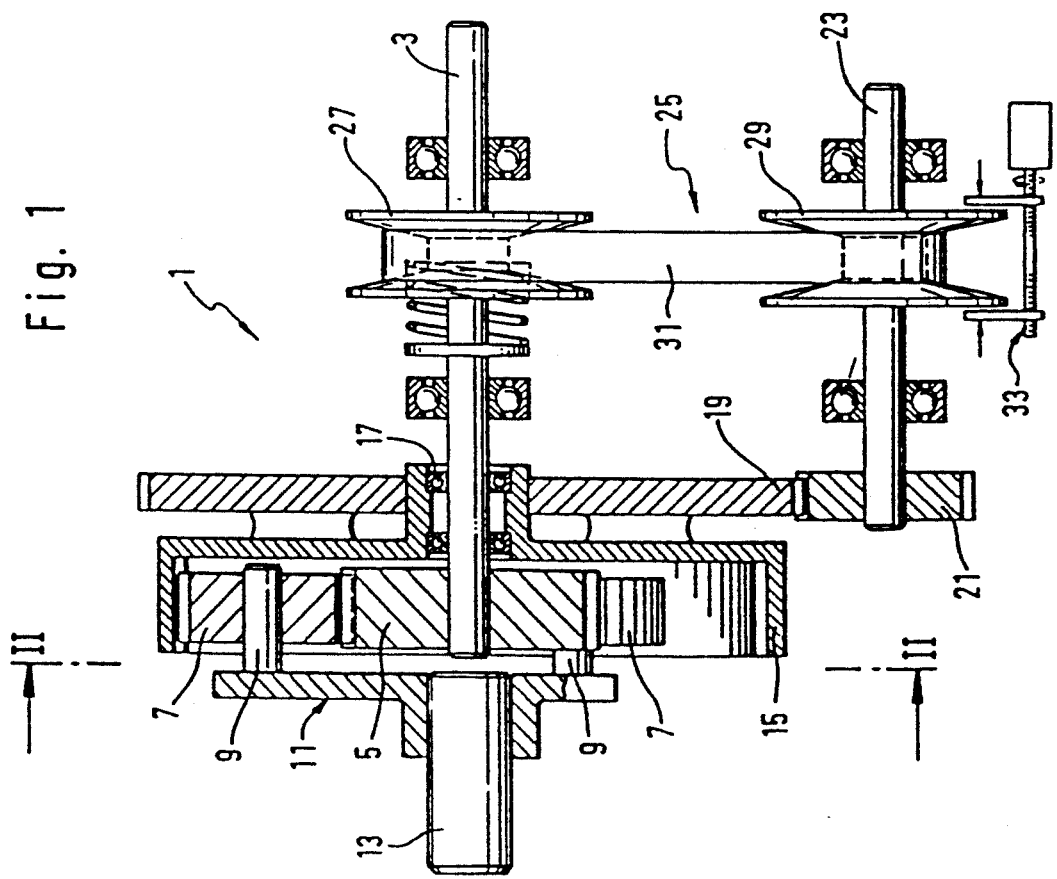

VARIABLE SPEED TRANSMISSION

This is a division of application Ser. No. 07/536,738, filed Jun. 12, 1990 now abandoned, which is a CIP of Ser. No. 07/388,863 filed Aug. 3, 1989 now abandoned which is a CIP of Ser. No. 07/293,422 filed Jan. 4, 1989 now abandoned.

BACKGROUND OF THE INVENTION a) Field of the Invention

The present invention is generally concerned with power transmissions for use in bicycles and motor vehicles, and more particularly with the incorporation of an infinitely adjustable, variable speed transmission unit into a bicycle driving mechanism or an automotive transmission system.

b) Brief Description of the Prior Art

Most power sources such as electric motors or internal combustion engines are designed to operate at fixed rotational speeds or within a limited speed range. However, the final application of the driving power may be at a different speed or may require a range of speeds. This is normally accomplished by the use of a gear reducer with mixed elements and a fixed output speed, or, in the case of an automotive drive, a gear box with several fixed gear combinations (usually 4 or 5) which allow for several steps in speed reduction.

Different devices have already been proposed, which provide speed adjustment over a smooth curve between the limits required for the driven equipment, thereby providing for the most efficient use of the applied power, and perfect control.

A first speed adjusting device of the above mentioned type is presently in use, and comprises variable pitch pulleys connected by an endless belt. This first device is efficient but has a limited range of speed variation.

A second speed adjusting device of the above mentioned type which is also presently in use, comprises friction drives whose respective positions can be varied to vary the speed. This device is also operative but friction drives are known to be wasteful of power and not capable of transmitting large loads.

A third speed adjusting device of the above mentioned type which is also in use, consists of a hydraulic transmission comprising a hydraulic pump and a motor, or a hydraulic clutch, in which large amounts of power are wasted in fluid friction to obtain the benefits of speed control.

A fourth speed adjusting device of the above mentioned type, which, to the Applicant's knowledge, is presently not in use anywhere, has also been suggested in some patents, including, by way of examples. U.S. Pat. Nos. 2,745,297 (ANDRUS); 2,755,683 (RYAN); 3,251,243 (KRESS); 3,503,279 (SIEVERT et al); 3,861,485 (BUSCH); 4,599,916 (HIROSAWA); 4,546,673 (SHIGEMATSU et al); 4,644,820 (MACEY et al) and 4,672,861 (LANZER).

The speed adjusting devices disclosed in these patents each comprise a first shaft, a sun gear fixed to the first shaft, at least two planetary pinions meshed with the sun gear, these pinion carrier, and a second shaft keyed to a pinion being freely mounted on spindles forming part of a pinion carrier, this second shaft being coaxial with the first one.

In addition to this basic structure, the variable speed adjusting devices disclosed in the above patents each comprise a ring gear freely mounted on any of the first and second shafts, this ring gear extending over and meshing with the planetary pinions. This ring gear is operatively connected to a countershaft pinion keyed to a countershaft which extends parallel to the first shaft, and a speed variating mechanism which can be of any type, is mounted between the first shaft and the countershaft to adjustably vary the relative speed of the countershaft and first shaft.

When, on the one hand, the ring gear is directly meshed with the countershaft pinion or is operatively connected thereto through such an even number of intermediate gears and/or belts so that they rotate in opposite directions, the entire output power or any part of it that is "diverted" to the ring gear through the planetary gears, is fed back to the first shaft via the countershaft and the speed variating mechanism. As a result, any adjustment of the speed variating mechanism to cause the countershaft to rotate at a given speed or no speed relative to the first shaft provides a corresponding positive adjustment of the speed of the first shaft relative to the speed of the second shaft. Assuming that the power input shaft is the first one and this first shaft is driven at constant speed, the speed of the output shaft, i.e. the second shaft, will thus be adjustable from a predetermined maximum value in one rotational direction to zero and even to another predetermined maximum value in the other direction (see, for example, U.S. Pat. No. 2,745,297 to ANDRUS).

When, on the other hand, the control gear is operatively connected to the countershaft through one or any odd number of intermediate gears and/or high torque drive belts or chains so that they rotate in the same direction, the input power is split into two streams merging on the pinion carrier and the second shaft, one "passing" through the countershaft and the ring gear, the other directly through the sun gear. As a result, less power is transmitted through the speed variating mechanism, thereby making it possible to achieve the same functions as any conventional synchro-mesh gear box with a similar, large power input but a smaller speed variator power load and a much smaller number of parts and gears.

In both cases, the speed variating mechanism may comprise a pair of conical pulleys respectively mounted onto the drive shaft and countershaft in a head-to-foot position, with an endless belt frictionally mounted onto the pulleys. Sliding of the belt over the length of the conical pulleys permits to obtain the requested adjustment (see U.S. Pat. No. 2,755,683 to RYAN).

More preferably however, the speed variating mechanism may comprise a pair of pulleys respectively mounted onto the drive shaft and the countershaft in such a manner as to extend in the same plane, with at least one of the pulleys consisting of a variable pitch sheave, and an endless belt mounted onto the pulleys. Adjustment of the pitch of one or both of the variable sheaves permits to obtain the requested adjustment of the relative speed of the first shaft and countershaft (see, for example, U.S. Pat. Nos. 2,745,297 to ANDRUS, and 3,503,279 to SIEVERT et al).

The speed variating mechanism may further consist of a hydraulic variable speed drive or a standard, variable motor (see, for example, U.S. Pat. No. 4,546,673 to SHIGEMATSU et al).

Although the above mentioned patents clearly show that different devices of the fourth type disclosed hereinabove having different structures and/or configurations of planetary gears and variators, have been proposed in the past, none of these devices is presently in commercial use in transmission systems, essentially because none of them has met the basic requirements for any speed variating device to be useful in a transmission, namely to be capable of varying speed with the variator operating within a practical (i.e. minimum) range, and to be mechanically efficient.

To the Applicant's opinion, this lack of practicality and efficiency of the known devices of the fourth type disclosed hereinabove comes from the general belief that in such devices, whatever be their "design", a portion of the power flows from the driving means (i.e. motor or engine) through the drive shaft, sun gear and planetary gears, and another portion flows through the variator to the countershaft, ring gear, and planetary gears, both of these portions recombining to form the output power to the output shaft. In practice, this is not true and this belief is clearly wrong in the case of the device shown in the ANDRUS U.S. Pat. No. 2,745,297, where the control gear is directly connected to the countershaft pinion. Indeed, in such a case, all the power is transmitted through the sun gear to the planetary gears, and the portion of this power (which can be designated as circulating power) is transmitted to the ring gear and from the countershaft to the variator, and thence back to the main drive shaft and sun gear. The power then transmitted by the sun gear to the planetary gears is thus equal to the sum of the output power plus the circulating power plus the mechanical losses in the system.

This particularity makes the system efficiency very critical, and unless all the structural components of the system are mathematically proportioned to minimize the mechanical losses, the overall efficiency of power transfer is too low to be acceptable for practical use. This particularity is of course critical to the design of any practical system and has been ignored in the early proposals to commercialize controlled planetary transmission systems.

The Applicant has investigated these problems and found by thorough mathematical analysis that, in order to overcome the deficiencies of the earlier designs, it is compulsory that the ratio of the radius of the sun gear to the radius of the planetary gears be kept within a very specific range. The basic formula for speed relationship between various elements of the unit is:

$$N_d = \left(1 + 2\frac{r_p}{r_d}\right)N_R + 2\left(1 + \frac{r_p}{r_d}\right)N_A + \ldots$$

wherein $N_d$ is the rotational speed of the drive shaft (rpm);
$N_R$ is the rotational speed of the ring gear (rpm);
$N_A$ is the rotational speed of the output shaft (rpm)
$r_p$ is the pitch radius of the planetary gear or pinion (ft);
$r_d$ is the pitch radius of the sun gear (ft);
$r_A$ is the distance from the center of the drive shaft to the center of the planetary gears (ft); and
$r_R$ is the pitch radius of the ring gear (internal).

The basic formula for the calculation of the circulating power, viz. the power which must be transmitted by the variator is:

$$HP_{circulating} = \frac{2\pi r_R N_R P_R}{33\,000}$$

-continued where:

$$P_R = P_A \frac{r_d N_d - r_A N_A}{r_d N_d + r_R N_R}$$

The circulating power can be several times as great as the transmitted power, depending on output speed and torque. As this power must be transmitted by belt, and the maximum circulating power occurs at the minimum output speed, which is when the variator is in the position where the pulley diameter is the smallest, it is essential to design the system with the minimum variation in the pulley diameters over the chosen range of speed. This is essential if the power is to be transmitted without belt slip, or breakage. If one plots various values of $r_p/r_d$ versus $N_d/n_R$ (which is the ratio of the drive shaft speed to the ring gear (or countershaft speed) which is essentially the variator pulley ratio, one can find that the lower is the ratio $r_p/r_d$, the smaller is the variator ratio, which gives the best power transmission possibilities. Since as demonstrated hereinabove the variator is affected by the ring gear speed ratios, the necessity to retain the lowest practical ratio $r_p/r_d$ is evident, as this gives the minimum change in ring gear speeds and variator ratio.

In practice, it has been found that a good practical value for $r_p/r_d$ considering the problem of a practical gear diameter to accommodate the countershaft is 0.5, which gives a variator ratio of 2 : 1. This has been found as the most suitable design condition to allow for transmission of maximum power. Lower $r_p/r_d$ ratios as low as 0.3 may however be used for smaller power loads.

In investigating these problems, the Applicant has also found that another factor which is very important in practical design is the diameter of the ring gear which governs the overall size of the unit.

By way of example, the device disclosed in the ANDRUS U.S. Pat. No. 2,745,297 uses an internal ring gear with an external gear on the outside of the internal gear, this external gear acting as control gear and meshing with the countershaft pinion. This increases the overall diameter of the unit, and by fixing the size of the external gear, does not allow any flexibility in the design of the connection between ring gear and countershaft (since it fixes the distance between the two).

An easy way of solving this problem, which is used in the present invention, consists in using a control gear which is separate from, and yet rigidly connected to the ring gear. The control gear diameter and width may be as large or small as desired, and provides complete flexibility for the design of the connection to the countershaft, and for the distance between the two shafts, thereby making it possible to accommodate any practical design for the variator.

SUMMARY OF THE INVENTION

A first object of the present invention is to provide a variable speed transmission device or unit of the fourth type disclosed hereinabove, whose structural components are mathematically proportioned to minimize mechanical looses and thus make it highly efficient, and to use such a unit as a speed ratio varying means in a bicycle, in lieu of the standard, gear-change mechanism commonly used in any multiple speed bicycle.

Due to its basic structure, the improved variable speed transmission unit used in accordance with the invention makes it possible to vary the speed of the bicycle in a very easy and continuous manner from any predetermined maximum value of rotation in the forward direction to 0. In other words, the speed of the bicycle may be varied in an infinite manner between a set of predetermined values in the forward direction, while the bicycle is running.

A second object of the present invention is to provide an improved variable speed transmission unit of the same type as disclosed hereinabove and to use this unit in an automotive transmission system together with a standard, two-speed and reverse gear box in order to achieve stepless speed control with a large power input.

More particularly, the present invention proposes an improved bicycle comprising a crank-gear, a rear hub sprocket, chain means for transmitting power from the crank-gear to the rear hub sprocket and means for varying the speed ratio of the crank-gear to the rear hub sprocket, wherein these speed ratio varying means consists of an infinitely adjustable, variable speed transmission unit comprising:

a first shaft operatively connected to, and driven by the crank shaft;

a sun gear fixed to the first shaft;

at least two planetary pinions meshed with the sun gear, the planetary pinions being freely mounted onto spindles forming part of a pinion carrier;

a second shaft keyed to the pinion carrier, the second shaft being coaxial with the first one;

an output sprocket keyed onto the first shaft, the output sprocket being operatively connected to the rear hub sprocket by a chain forming part of the chain means;

a ring gear freely mounted onto any of the first and second shafts, the ring gear extending over and meshing with the planetary pinions;

a control gear fixed to the ring gear;

a countershaft pinion operatively connected to the control gear by direct meshing or through an even number of intermediate gears, belts or chains so that the countershaft pinion and control gear rotate in opposite directions;

a countershaft keyed to the countershaft pinion, the countershaft extending parallel to the drive shaft; and a speed variating mechanism mounted between the first shaft and the countershaft to adjustably vary the relative speed of the countershaft with respect to the first shaft.

With such a structural arrangement, power is transmitted from the crank-gear to the first shaft of the speed transmission unit; then from the first shaft to the second shaft of the speed transmission unit through the same; and finally from the second shaft to the rear hub sprocket through the chain, any adjustment of the speed variating mechanism to cause the countershaft to rotate at a given speed or no speed relative to the first shaft providing a corresponding positive adjustment of the speed of the second shaft and thus of the rear hub sprocket relative to the speed of the first shaft and thus of the crank-gear.

Advantageously, the crank-gear may be connected to a sprocket keyed onto the first shaft by another chain to allow the variable speed transmission unit to be mounted onto the bicycle at a distance away from the crank-gear.

The present invention also proposes a variant to the above recited structure. According to this variant, an improved bicycle is provided, having a crank-gear, a rear hub sprocket, chain means for transmitting power from the crank-gear to the rear hub sprocket and means for varying the speed ratio of the crank-gear to the rear hub sprocket, wherein the speed ratio varying means consists of an infinitely adjustable, variable speed transmission unit comprising:

a first shaft;

an output sprocket keyed onto the first shaft, the output sprocket being operatively connected to the rear hub sprocket by a chain forming part of the chain means;

a sun gear fixed to the first shaft;

at least two planetary pinions meshed with the sun gear, the planetary pinions being freely mounted onto spindles forming part of a pinion carrier;

a second shaft keyed to the pinion carrier, the second shaft being coaxial with the first one and operatively connected to, and driven by the crank-gear;

a ring gear freely mounted onto any of the first and second shafts, the ring gear extending over and meshing with the planetary pinions;

a control gear fixed to the ring gear;

a countershaft pinion operatively connected to the control gear by direct meshing or through an even number of intermediate gears, belts or chains so that the countershaft pinion and control gear rotate in opposite directions;

a countershaft keyed to the countershaft pinion, the countershaft extending parallel to the first shaft; and a speed variating mechanism mounted between the first shaft and the countershaft to adjustably vary the relative speed of the countershaft with respect to the first shaft.

Power is transmitted from the crank-gear to the second shaft of the speed transmission unit; then from the second shaft to the first shaft of the speed transmission unit through the same; and finally from the first shaft to the rear hub sprocket through the chain, any adjustment of the speed variating mechanism to cause the countershaft to rotate at a given speed or no speed relative to the first shaft providing a corresponding positive adjustment of the speed of the first shaft and thus of the rear hub sprocket relative to the speed of the second shaft and thus of the crank-gear.

Advantageously, the crank-gear may also be connected to the second shaft by another chain to allow the variable speed transmission unit to be mounted onto the bicycle at a distance away from the crank-gear.

The present invention also proposes an improved automotive transmission system for use in a motor vehicle, which system comprises an infinitely adjustable, variable speed transmission unit comprising:

a first shaft operatively connected to the motor of the vehicle;

a sun gear fixed to the first shaft;

at least two planetary pinions meshed with the sun gear, the planetary pinions being freely mounted onto spindles forming part of a pinion carrier;

a second shaft keyed to the pinion carrier, the second shaft being coaxial with the first shaft;

a ring gear freely mounted onto any of the first and second shafts, the ring gear extending over and meshing with the planetary pinions;

a control gear fixed to the ring gear;

a countershaft pinion operatively connected to the control gear through one or any other odd number of intermediate gear(s), belt(s) or chain(s) so that the countershaft pinion and control gear rotate in the same direction;

a countershaft keyed to the countershaft pinion, the countershaft extending parallel to the first shaft; and a speed variating mechanism mounted between the drive shaft and the countershaft to adjustably vary the relative speed of the countershaft and the first shaft.

The automotive transmission system according to the invention also comprises a standard, two-speed and reverse gear box directly connected to the second shaft of the variable speed transmission unit.

In use, any power input applied by the motor to the first shaft is split into two streams merging on the pinion carrier and second shaft, one passing through the speed variating mechanism, countershaft and ring gear, the other directly through the sun gear. Moreover, stepless ratio control is achieved with a large power input and a very simple gear box.

Preferably, the ratio of the radius of the planetary pinions to the radius of the sun gear of the transmission unit is ranging between 0.3 and 0.5, and is preferably equal to 0.5 in order to allow maximum power transmission while remaining with a practical and efficient size.

BRIEF DESCRIPTION OF THE DRAWINGS

The invention will be better understood upon reading the following non-restrictive description given in connection with the accompanying drawings in which:

FIG. 1 is a schematic cross-section view showing the basic components of the variable speed transmission unit used in the bicycle and automotive transmission system according to the invention;

FIG. 2 is a cross-sectional view taken along line II—II of FIG. 1;

DESCRIPTION OF PREFERRED EMBODIMENTS OF THE INVENTION

Figure 3:
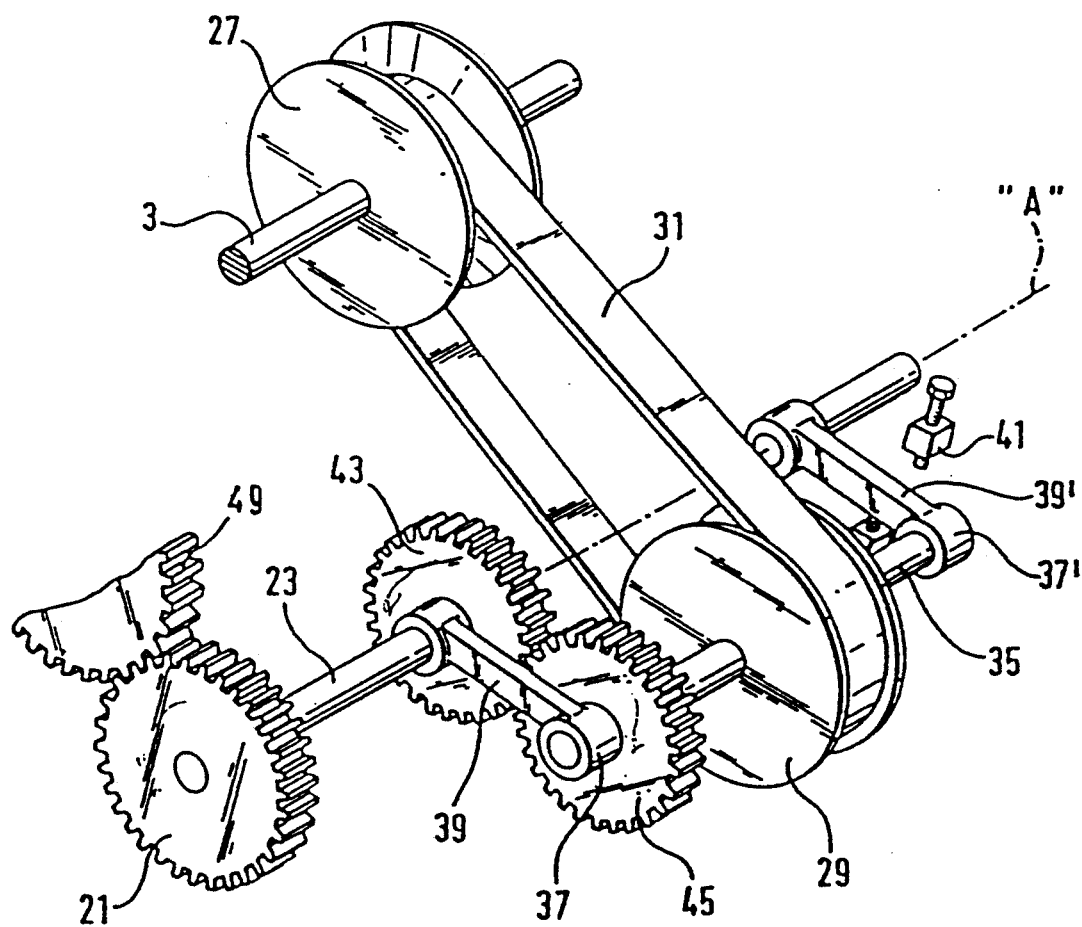
FIG. 3 is a perspective view of an automatic belt tensioning device for use in the unit shown in FIGS. 1 and 2.

The variable speed transmission units used in the bicycle and automotive transmission system according to the present invention contain, numerous similar structural components. For the purpose of consistency, the same components have been identified with the same reference numerals in all the figures of the accompanying drawings.

The variable speed transmission unit 1 used in the improved bicycle according to the invention as is shown in FIGS. 4 and 5a to 5d, is better shown in different proportions in FIGS. 1 and 2. It basically comprises a first shaft 3 provided with a sun gear 5 at one end. It also comprises two or more planetary pinions 7 freely mounted on spindles 9 projecting from a pinion carrier or spider 11. The pinions 7 are symmetrically positioned around the sun gear 5 with the teeth of the pinions 7 intermeshing with those of the sun gear 5. The pinion carrier 11 is keyed to a second shaft 13 aligned with the first shaft 3.

The variable transmission unit 1 further comprises a ring gear 15 provided with teeth on its internal face. The ring gear 15 is mounted onto the first shaft 3 by means of a bearing 17 that makes it free to rotate on its own. It should be understood however that the ring gear 15 could also be freely mounted on the second shaft 13 as the latter is in line with the first shaft 3.

The ring gear 15 extends over the planetary pinions 7 and has its internal teeth meshed with the teeth of these pinions 7. A control gear 19 which is separate from the ring gear 15 is coaxially positioned with respect to the ring gear 15 and rigidly fixed thereto in order to rotate therewith about the first shaft 3.

The teeth extending over the external periphery of the control gear 19 mesh with the teeth of a countershaft pinion 21 keyed to a countershaft 23 extending parallel to the first shaft 3.

A speed variating mechanism 25, is mounted between the first shaft 3 and countershaft 23 to adjustably vary the relative speed of these countershaft and drive shaft.

In the embodiment shown in the accompanying drawings, the speed variating mechanism which is numbered 25 comprises a pair of pulleys 27 and 29 respectively mounted on the drive shaft 3 and countershaft 23 in such a manner as to extend in a same plane perpendicular to the drive shaft and countershaft axes. The pulleys 27 and 29, consist of variable pitch sheaves on which an endless belt 31 is frictionally engaged. Means 33 of conventional structure are provided for controllably adjusting the pitch of at least one of the variable sheaves. These means which may include, for example, a small endless screw operated by an electrical motor, are used for adjusting the pitch of only one of the sheaves, namely the one numbered 29, while the pitch of the other sheave 27 is automatically adjusted by means of a spring. This particular arrangement which is known per se allows the belt 31 to be shifted in one or the other direction and vary the rotational speeds of the pulleys with respect to each other.

Other mechanisms known per se may also be used to achieve the same result. By way of example, use can be made of pivot links connected to both sheaves so that when one is going in, the other is going out, with both of them remaining perpendicular to the axes of their respective shafts (see FIG. 5). Use can also be made of a hydraulic, variable speed drive of any conventional structure, or of a variable speed motor.

The variable speed transmission unit 1 shown in FIGS. 1 and 2 is rather conventional except for the control gear 19 which, according to the invention, is separate from the ring gear 15. This unit 1 operates as follows.

Assuming that the first shaft 3 is driven at a constant speed and the ring gear 15 is locked in stationary position, the pinions 7 roll on the internal surface of the ring gear 15 and transmit their angular speed to the pinion carrier 11, thereby driving the second shaft 13 at the same speed.

Assuming now that the first shaft 3 is driven anticlockwisely at a constant speed and the ring gear 15 is allowed to rotate clockwisely as shown with arrows in FIG. 2, the planetary pinions 7 will rotate clockwisely about their axes and the pinion carrier 11 will rotate anticlockwisely at a lower speed dependent on the rotational speed of the ring gear 15. Then, the unit 1 will operate as any conventional sun and planet gear reductor.

Provided that the ring gear 15 rotates at the same pitch line velocity as the sun gear 5, the planetary pinions 7 will rotate about their axes but not move in an angular direction.

For any rotational speed of the ring gear 15 between these two limits, i.e. the one where it is locked in a stationary position and the one where it rotates at the same pitch line velocity as the sun gear 5, the second shaft 13 will rotate at some speed varying between the speed of the first shaft 3 and zero.

To make the unit 1 operative as disclosed hereinabove, it is quite apparent that some resisting torque is required on the ring gear 15 to produce equilibrium in the system. This torque may be applied by a frictional brake. However, in such a case, the power absorbed by the brake would be dissipated and wasted.

In the unit shown in FIGS. 1 and 2 such a waste is avoided by using a "power feedback" loop formed by the control gear 19, the countershaft gear 21, the countershaft 23 and the speed variating mechanism 25. Indeed, this loop which connects the ring gear 15 to the first shaft 3 via the countershaft 23 causes the power resulting from the resisting torque to be returned or "recirculated" to the first shaft 3 and to be "reabsorbed" by the same, the only power losses thus being due to the gear and belt friction.

Change in the speed of the countershaft 23 obtained by adjustment of the speed variating mechanism 25 will cause a corresponding change in the rotational speed of the ring gear 15 and, consequently, in the speed of the second shaft 13. In this connection, it should be noted that, for any given output arm torque, a corresponding value of the pitch line force will be required at the sun gear 5. As the power source supplied only that portion of the required force which corresponds to its power and speed (according to the fixed gear ratio of the unit), the additional force required for applying the requested torque will be supplied by the power recirculated through the countershaft 23 back into the first shaft 3. Thus, as the gear ratio of the unit remains fixed, the torque on the sun gear 5 will be increased to provide the increasing output torque at decreasing speeds.

As can now be easily understood, the following advantages derive from the invention:

1) Any range of speed variation from the input speed value to 0 can be obtained, with speed change controlled during operation by a very simple speed variating mechanism. Reverse rotation could even be achieved, although such is not required for a bicycle transmission.

2) Power transmission is positive since all members of the unit are mechanically connected.

3) The efficiency of the unit is that of a conventional gear drive unit, since the only power losses are those due to the gear, bearings and belt friction.

Of course, different ratios for the sun gears, planetary pinions 7, ring 15, 19 and countershaft pinion may be used to alter the general characteristics and, in particular, the output value of the unit 1. As a matter of fact, the unit 1 may even be "reversed": power may be supplied to the first shaft 3 to drive the second shaft 13 as was disclosed hereinabove, or, alternatively, power may be supplied to the second shaft 13 to drive the first shaft 3, with the same range of speeds.

As explained hereinabove, it has been found by the Applicant that the ratio $r_p/r_d$ (pitch radius of planetary pinions to pitch radius of sun gear) must be as low as practically possible, preferably within 0.3 to 0.5.

It may be understood that the actual torque will increase (if resistance is applied) until the belt or rope used in a speed variating mechanism 25 slips. Such a slipping is of course the governing factor in the amount of torque that can be developed at low speed.

When use is made of a speed variating mechanism where power is small, no difficulty will be encountered with the recirculation power. Then, the $r_p/r_d$ ratio may be as small as 0.3. However, where large amounts of power must be transmitted at low speed-high output torque from the countershaft 23 to the first shaft 3 by means of a belt or a rope, it is still desirable to keep recirculation torque on the countershaft at a minimum. This calls for a minimum $r_p/r_d$ ratio.

If higher ratio are required, it may be necessary to use an auxiliary gear reduction on the output shaft to allow high torques at low speeds. The gear reduction box used for this purpose can be designed to provide different output ratios such as a 1:1 ratio for fast speed and a lower ratio for low speed and high torque.

To keep the re-circulated torque on the countershaft to a minimum, use may also be made of a ring gear having a small radius and/or a low speed.

When the speed variating mechanism is a belt driven device as is shown in the accompanying drawings, it may be necessary to avoid speed fluctuation which may occur due to slackness and slippage of the belt. For this purpose, an automatic belt tensioning device as shown in FIG. 3 may be used to automatically maintain the belt under tension and thus prevent slippage.

In such a device, the pulley 29 on which the belt 31 winds is keyed onto a shaft 35 which extends parallel to the first shaft 3 and countershaft 23. The ends of the shaft 35 are rotatably mounted in bearings 37, 37' provided at the ends of a pair of connecting rods 39, 39' that are pivotably mounted at their other ends about the axis "A" of the countershaft 23. Thus, the shaft 35 and pulley 29 are swingably mounted with respect to the countershaft 23. Stop means 41 that may be adjustable may be used to limit the swing motion within a given angular range.

The rotational motion of the countershaft 23 is transmitted to the pulley 29 by means of a first gear 43 keyed onto the countershaft 23 and meshed with a second gear 45 of smaller diameter than the pulley 29, which second gear is keyed on the same shaft 35 as the pulley 29. Because of the gears 43, 45 the rotation directions of the countershaft 23 and shaft 35 are inverted. To correct this discrepancy when the rotation of the countershaft 23 must be the same direction as the one of the sun gear 5 and first shaft 3, a supplemental gear 49 may be mounted between the countershaft gear 21 and control gear 19.

As can be understood, rotation of the first gear 43 with the countershaft 23 causes the shaft 45 to be swung via the second gear 45 in a direction that may be so selected as to permanently tighten the belt 39 while it is driven. As can also be understood, the tension applied to the belt 39 is automatically proportionate to the power being transmitted.

FIGS. 4 and 5a to 5e show a first practical application of the variable speed transmission unit 1 disclosed hereinabove. In this application which forms one of the objects of the present invention, the unit 1 is incorporated into a bicycle in order to vary and adjust at will the speed ratio of the crank gear to the hub sprocket of the rear wheel.

Figure 4:
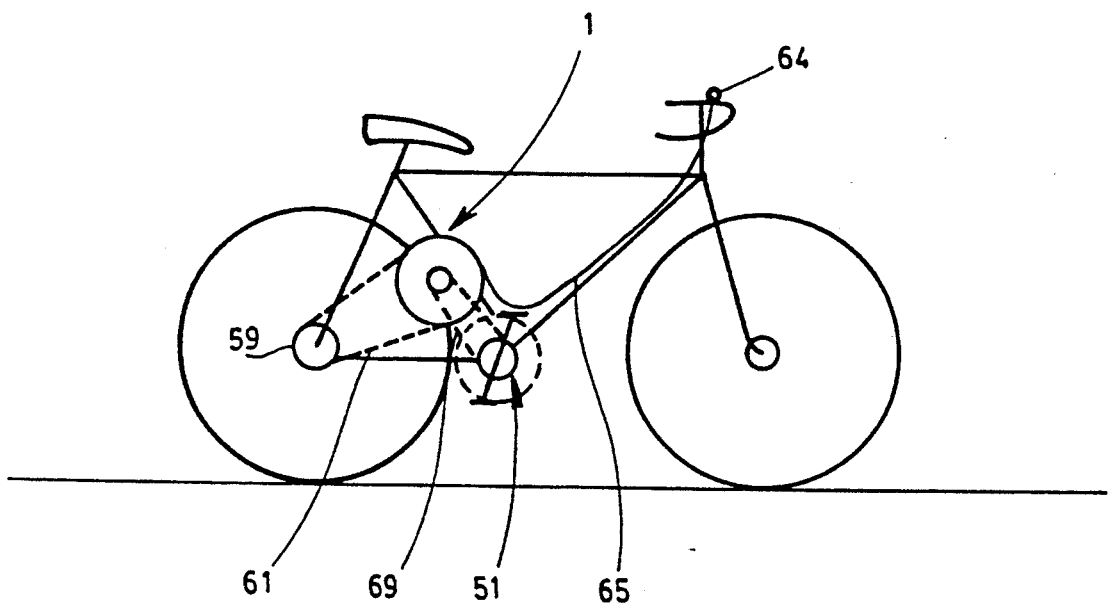
FIG. 4 is a schematic representation of a bicycle according to the invention, incorporating a variable speed transmission unit as shown in FIGS. 1 and 2, mounted on the bicycle frame at a distance away from the crank-gear.
Figure 5A:
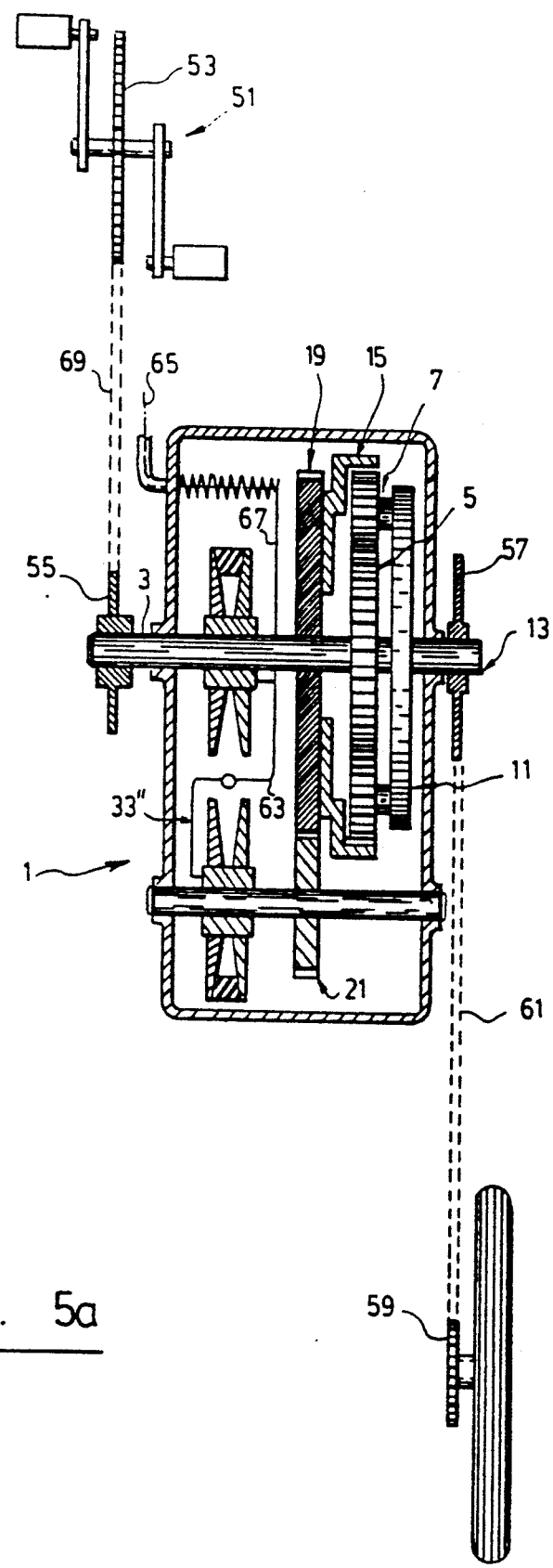
FIG. 5a is a schematic representation of the driving components of the bicycle according to the invention as shown in FIG. 4, showing the variable speed transmission unit in cross section.

As shown in FIG. 4 and 5a, the bicycle has a crank gear 51 including a driving gear 53 connected by a chain 69 to a sprocket 55 keyed onto the first shaft 3 of the unit 1 which is mounted onto the bicycle frame at a distance away from the crank gear 51 to be outside the circle of the pedals (see FIG. 4). An output sprocket 57 is keyed onto the second shaft 13 of the unit 1 and is connected to the rear hub sprocket 59 of the rear wheel by means of a chain 61, as is known and commonly done.

The speed variating mechanism 33" of the unit 1 is of a type already mentioned hereinabove. It includes a pivot link 63 connected to both sheaves and operable from the handle bar of the bicycle through a finger operable control knob 64 fixed to one end of the handle bar (see FIG. 5), a cable 65 and a spring-biased lever 67.

In use, the bicycle rider is supposed to apply a constant physical effort to the locomotion and to change the transmission ratio using the unit 1 to suit different road conditions, i.e. flat, up or down.

The unit 1 is advantageously selected so that, on flat road, the transmission ratio is somewhere between high and low; on up slope, the transmission ratio is high, and the drive sprocket speed low; and on-down slope, the transmission ratio is low and the drive sprocket speed high for all down grades.

To achieve such a variation of transmission ratio, the only control that is required, is on the speed variating mechanism 33 of the unit 1, the ratios of the various gears; pinions, sprockets, etc. being preadjusted to achieve the desired reduction or increase in speed/power transmission.

In the embodiment shown in FIG. 5a, the first shaft 3 and sun gear 5 is driven from the bicycle pedals through a speed step-up sprocket arrangement of, say, 4:1. The output from the driven spider 11 is however lower in speed than the input. Accordingly, it is necessary to provide a second step-up sprocket arrangement of, say, 5:1 in order to obtain the required road speed for the bicycle.

If use is made of a bicycle as shown in FIGS. 4 and 5a having the following specifications:

| | |
|---|---|
| 1st chain drive ratio (from crank gear 51 to first shaft 3) | 4.5:1 |
| $r_p/r_d$ ratio | 0.33 |
| control gear/countershaft pinion ratio | 4.1 |
| variator range | 2:1 to 1:2 |
| 2nd chain drive ratio (from output sprocket 57 to rear hub sprocket 59) | 5:1 | the following results will be obtained for a constant rotational speed of 33 r.p.m. applied to the pedals:

| | |
|---|---|
| rotational speed of the first shaft 3 | 148.5 r.p.m. |
| rotational speed of the second shaft 13 | low 9.5 r.p.m. |
| | high 44.2 r.p.m. |
| rotational speed of rear hub sprocket 59 | uphill 47.5 r.p.m. (4 M.P.H.) |
| | flat road 220 r.p.m. (18 M.P.H.) |

In such a case, the unit 1 is therefore designed to allow the rider to propel the bicycle at a speed of, say, 18 mph on a flat level paved road at a pedal speed of 33 rpm, and at a minimum sped of 4 mph on a steep incline. The unit will provide for any intermediate position between these extremes, the physical effort and pedal rotation remaining constant at all road conditions.

Figure 5B:
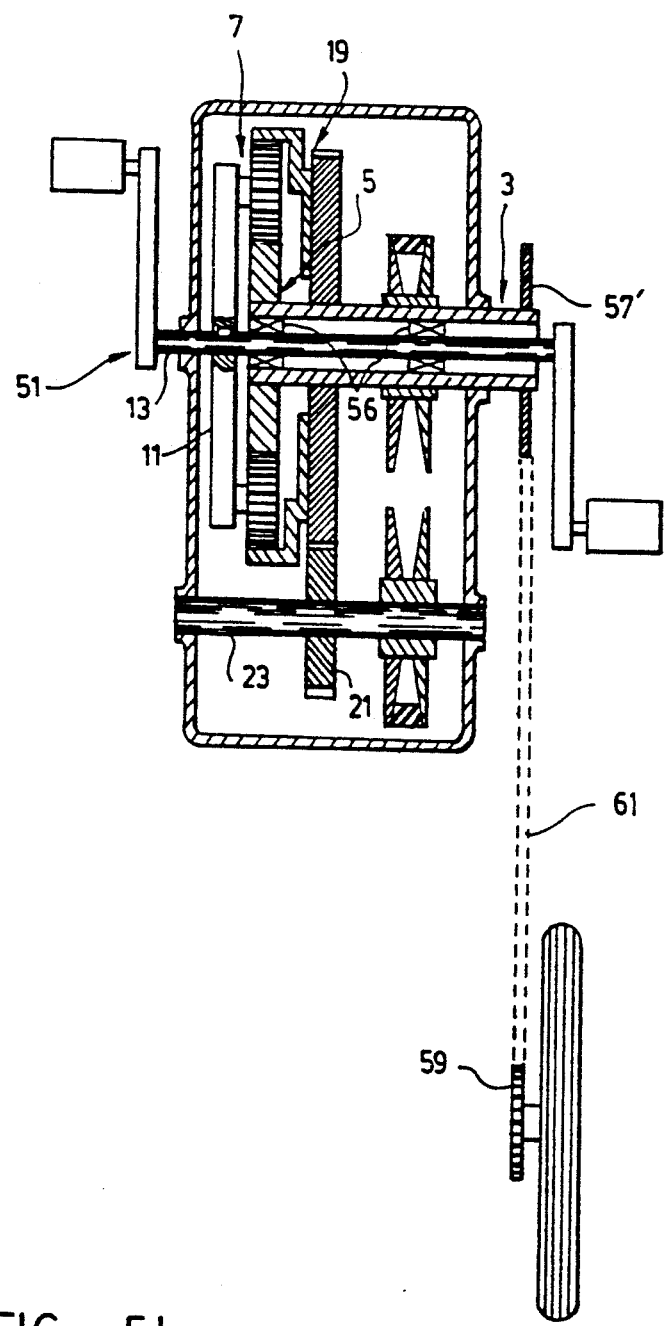
FIG. 5b, 5c, 5d and 5e are schematic representations similar to the one of FIG. 5a, showing practical alternative configurations that may be used to achieve the same purpose.

An alternative configuration that may be used to achieve the same purpose in a bicycle application is shown in FIG. 5b. In this configuration, the unit 1 is "incorporated" into the structure of the crank gear 51 with the second shaft 13 of the unit 1 extending through the same and acting as pedal driven shaft and the first shaft of the unit in the shape of a quill 3', coaxially mounted by means of bearings 56 onto the pedals supporting the second shaft 13, the quill 3' driving the chain 61 and rear hub sprocket 59 via an output sprocket 57' keyed on it.

As can be understood, the spider 11 is driven from the pedals and the outdrive is from the sun gear 5 keyed onto the quill-shaped, first shaft 3'. In this case, the unit 1 does not reduce the speed but increases it. A set of speed step-up sprockets is eliminated and a reduced ratio of speeds is provided between the unit 1 and the driven road wheel.

If use is made of a bicycle as shown in FIG. 5b having the following specifications:

| | |
|---|---|
| $r_p/r_d$ ratio | 0.33 |
| control gear/countershaft pinion ratio | 4:1 |
| variator range | 2:1 to 1:2 and |
| chain drive ratio (from output sprocket 57' to rear hub sprocket 59) | 1:2 | the following results will be obtained for a constant rotational speed of 33 rpm applied to the pedals:

| | |
|---|---|
| rotational speed of second shaft 13 | 33 rpm |
| rotational speed of first shaft 3' | low 110 rpm |
| | high 516 rpm |
| rotational speed of rear hub sprocket | uphill 55 rpm (4.5 m.p.h.) |
| | flat road 258 rpm (20 m.p.h) |

Figure 5C:
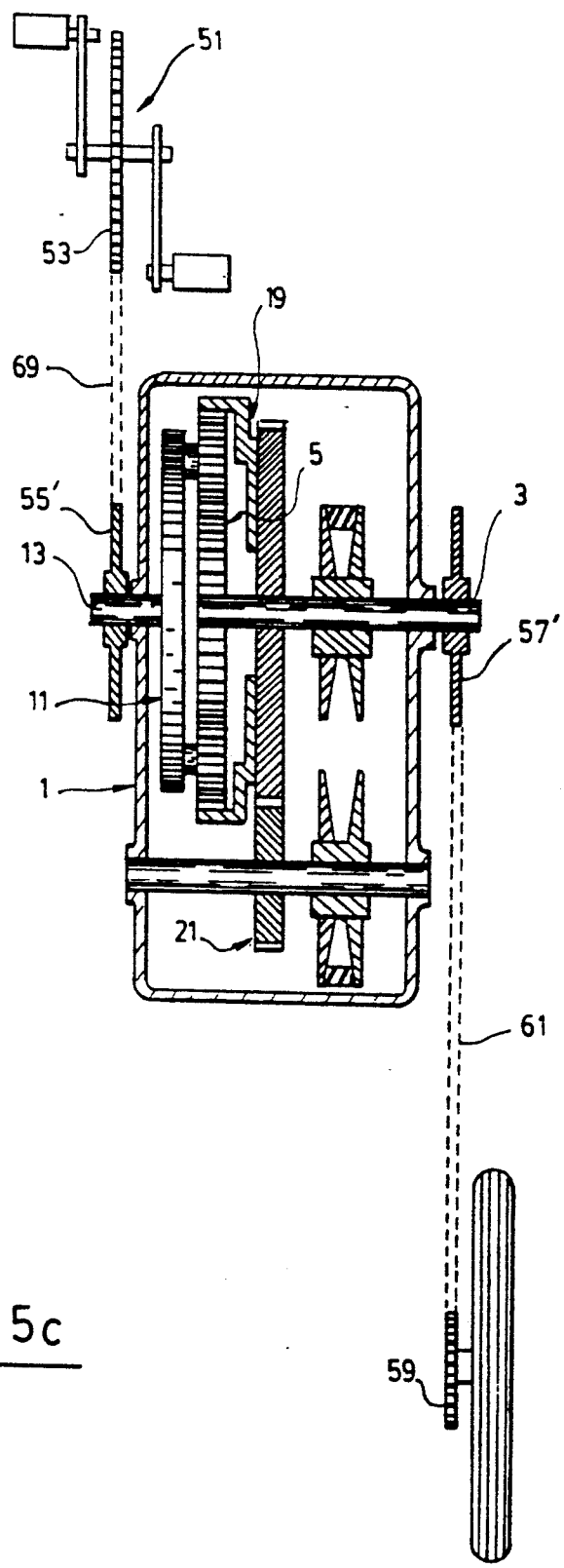

Another alternative configuration that may be used is shown in FIG. 5c. This configuration is very similar to the one shown in FIG. 5b, except that the pedals are not mounted on the second shaft 13 and thus do not drive the unit 1 directly. Rather, the crank gear 51 is separated from the unit 1 as is shown in FIGS. 4 and 5a and connected thereto through a chain and sprocket arrangement. The resulting structure is mechanically very much simplified as compared to the structure shown in FIG. 5b.

If use is made of a bicycle as shown in FIG. 5c having the following specifications:

| 1st chain drive ratio (from crank gear 51 to sprocket 55' keyed on second shaft 13) | 1:1 |
|---|---|
| $r_p/r_d$ ratio | 0.33 |
| control gear/countershaft pinion ratio | 4:1 |
| variator range | 2:1 to 1:2 and |
| 2nd chain drive ratio (from output sprocket 57' keyed on first shaft 3 to rear hub sprocket 59) | 1:2 | the same results as above for the embodiment of FIG. 5b will be obtained for a constant rotational speed of 33 rpm applied to the pedals.

Figure 5D:
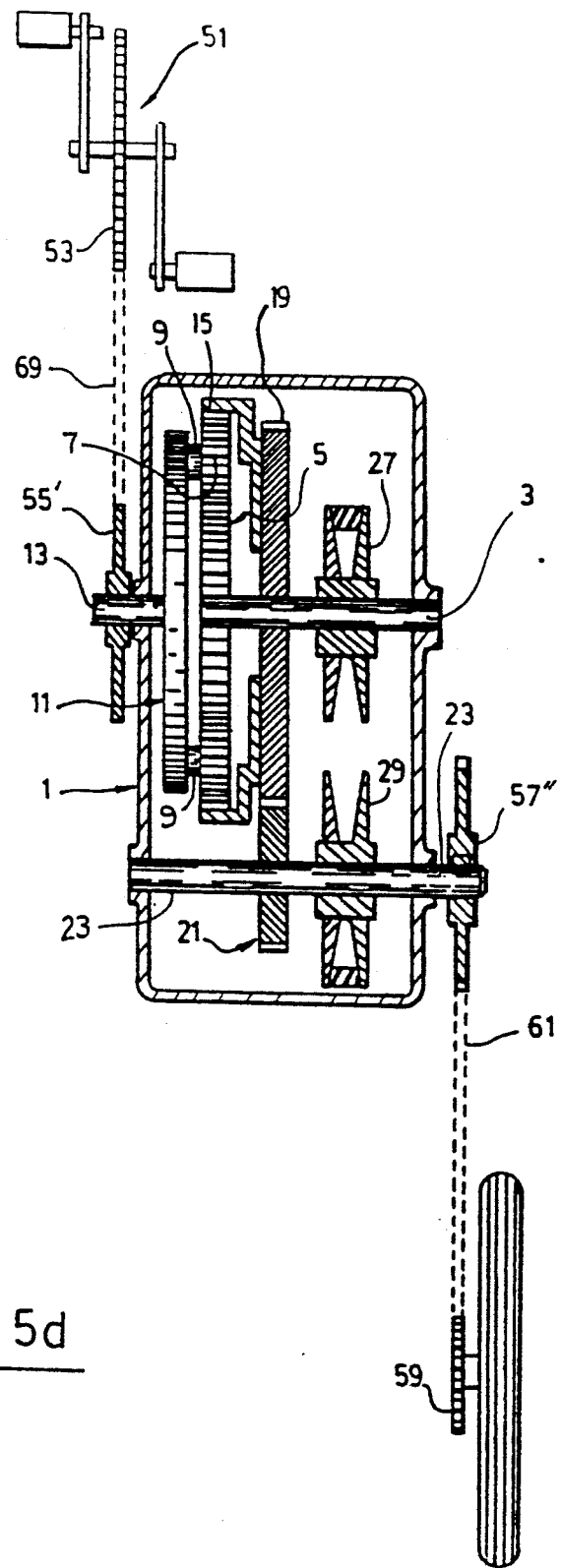

A further alternative configuration is shown in FIG. 5d. In this particular configuration as in the one shown in FIG. 5c, the crank gear 51 is connected to a sprocket 55' keyed on the second shaft 13 by a chain 69. In such a case however, the rear hub sprocket 59 is driven via the chain 61 by an output sprocket 57" keyed onto the countershaft 23. This arrangement provides for a satisfactory range of speed on the unit 1 with a reduced range of speed required from the variator.

If use is made of a bicycle as shown in FIG. 5d having the following specifications:

| 1st chain drive ratio (from crank gear 51 to sprocket 55' keyed on second shaft 13) | 1:1 |
|---|---|
| $r_p/r_d$ ratio | 0.33 |
| control gear/countershaft pinion ratio | 6:1 |
| variator range | 2:1 to 1:1.66 |
| 2nd chain drive ratio (from output sprocket 57" keyed on countershaft 23 to rear hub sprocket 59) | 1:1 | the following results will be obtained for a constant rotational speed of 33 rpm applied to the pedals:

| rotational speed of second shaft 13 | 33 rpm |
|---|---|
| rotational speed of first shaft 3 | low 51 rpm high 270 rpm |
| rotational speed of rear hub sprocket | uphill 51 rpm (14.2 mph) flat road 270 rpm (22 mph) |

Figure 5E:
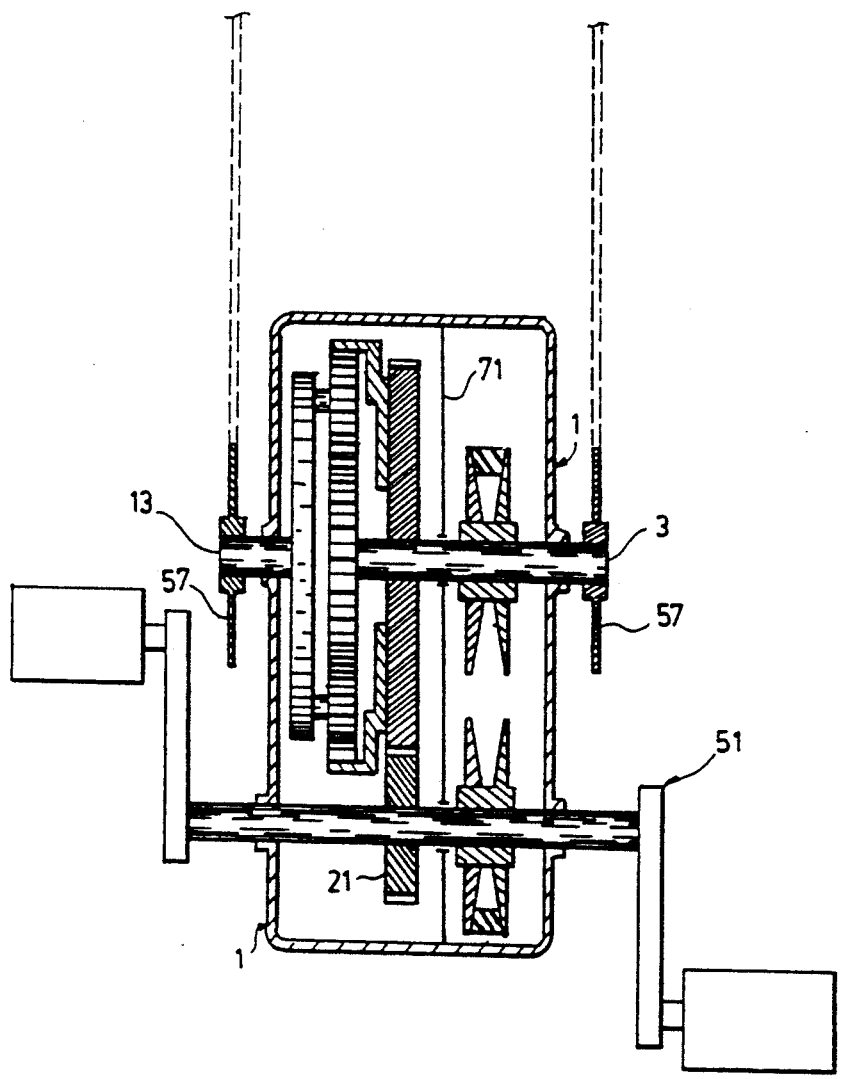

Still a further alternative configuration is shown in FIG. 5e. In this particular configuration, the countershaft 23 of the unit 1 is part of the crank gear 51 and acts as the pedal driven shaft of this crank gear. The indrive is thus on the countershaft 23. The output sprocket 57 connected by a chain (not shown) to the rear hub sprocket (not shown) can be keyed on either the first shaft 3 or the second shaft 13. This arrangement allows the pedal drive to be directly mounted on the unit thereby eliminating one set of sprockets and a chain (as in the embodiment shown in FIG. 5b).

Advantageously, a separation wall 71 may be provided inside the unit as is shown in FIG. 5e, to separate lubricated from non-lubricated areas. By the way, such a separation wall may be used in all the configurations disclosed hereinabove.

If use is made of a bicycle with a driving configuration as shown in FIG. 5e having the following specifications:

| $r_p/r_d$ ratio | 0.33 |
|---|---|
| control gear/countershaft pinion ratio | 6.1 |
| variator range | 2:1 to 1:2 or 2:1 to 1:15 | the following results will be obtained for a constant rotational speed of 33 rpm applied to the pedals:

a) if the output sprocket 57 is mounted on the second shaft 13 and the chain drive ratio of the output sprocket to the rear hub 5 sprocket is 10:1:

| rotational speed of the output sprocket | low 4.85 rpm high 21.4 rpm |
|---|---|
| rotational speed of the rear hub sprocket | uphill: 48.5 rpm (4 m.p.h.) level road: 214 rpm (17.5 m.p.h.) | b) if the output sprocket 57 is mounted on the first shaft 3 and the chain drive ratio of the output sprocket to the rear hub sprocket is 3:1:

| rotational speed of the output sprocket | low 16.5 rpm high 66.0 rpm |
|---|---|
| rotational speed of the rear hub sprocket | uphill 49.5 rpm (4 m.p.h.) level road: 198 rpm (16 m.p.h.) |

Adjustment of the unit 1 to road conditions may be manual or automatic. In the manual mode, the rider will adjust the knob 69 on the handle bar to adjust the transmission whenever his or her physical effort increases, so that the vehicle speed and physical effort are maintained at the normal level.

In the automatic mode, the resistance to motion of the vehicle can be measured in several ways, such as:

1. by the chain tension in the chain drive to the rear wheel using, to do so, a sprocket mounted on a swing arm under spring tension, running on the drive (tight) side of the chain, the arm moving with increasing or decreasing tension in the chain to set the variator position on the transmission unit to suit the road condition and the power applied at the pedal;

2. by a bubble type level or inclinometer which will register the incline and use an electrical contact to adjust the unit 1 to the proper speed; or 3. by a measurement of the pedal pressure which will readjust the unit 1 when pedal pressure rises above the normal (level road) condition.

In general, manual adjustment will be preferable since it leaves all control directly in the hands of the rider, and does not require calibration of the transmission unit to suit the physical effort desired by the rider.

Figure 6:
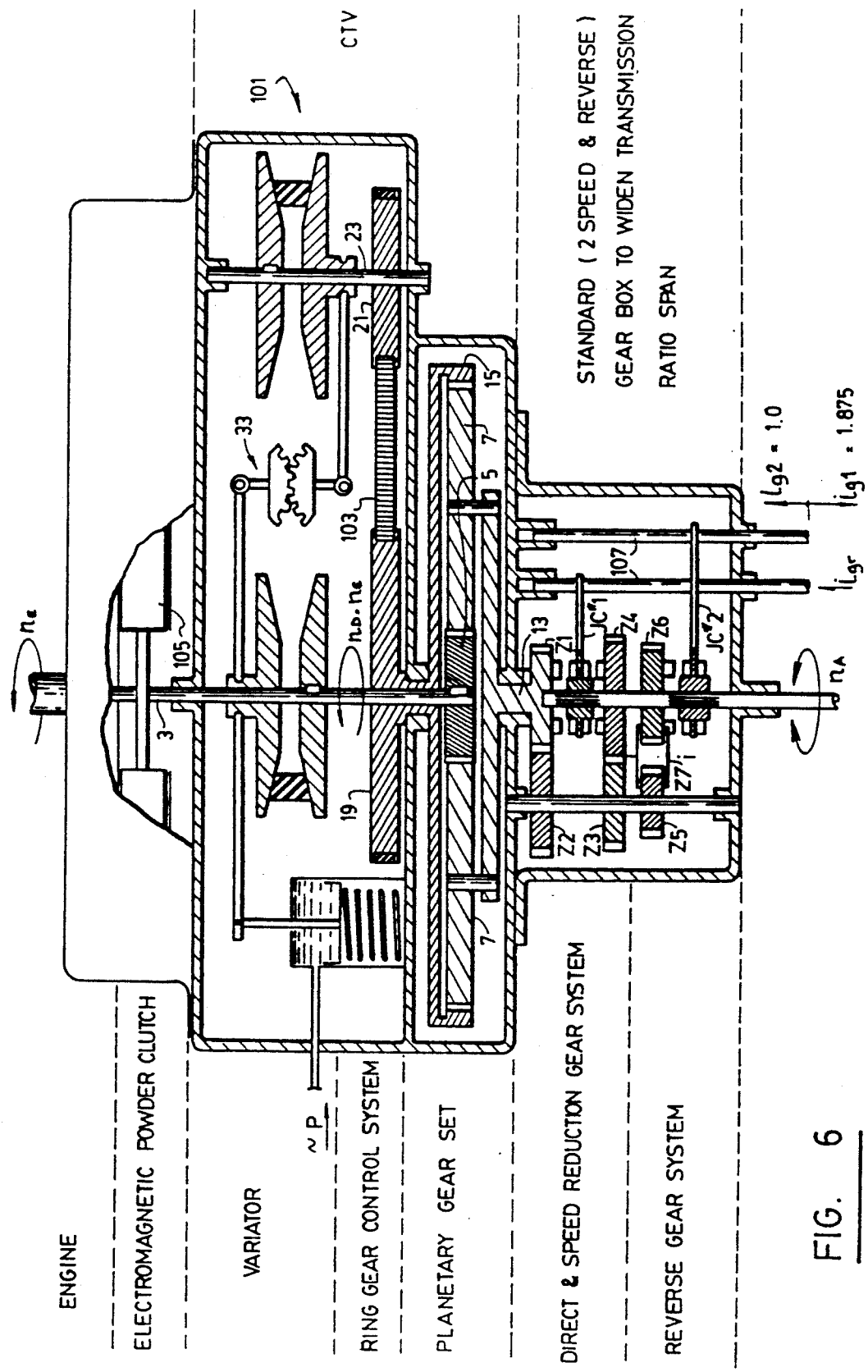
FIG. 6 is a diagrammatic cross-sectional view showing the components of an automotive transmission system according to the invention, incorporating a variable speed transmission unit slightly different from the one shown in FIGS. 1 and 2.

FIG. 6 shows another practical embodiment of the variable speed transmission unit disclosed hereinabove. In this other application which forms the second object of the present invention, the variable speed transmission unit that is numbered 101 in FIG. 6 is used as an automotive transmission system, in the place of the conventional manual synchro-mesh gear boxes or torque converter assisted automatic transmissions which, with their great numbers of friction clutches (usually 7), one-way clutches (usually 4), planetary gear sets (usually 3). lock-up clutch, oil pumps, sophisticated hydraulic system and the like, give only a very limited number of ratios, 2, 3 or 5 in most of the cases.

The automotive transmission system which is shown in FIG. 6, and broadly claimed hereinafter incorporates the speed transmission unit 101 and an extremely simple gear box of a standard type, comprising two forward speed and a reverse. The resulting system thus provides two transmission gear ranges which cover the complete range of the conventional automotive 4, 5 or 6 gear transmission. Its planetary gear set with its speed variating mechanism provides a synchronizing mechanism which allows for stepless speed conversion over the full range from direct drive to low speed drive.

In effect, the transmission system according to the invention is thus a very simple and cheap mechanism which covers the full speed range achieved by the conventional automotive transmission but with the added advantage of stepless speed control between gear changes and perfect road speed control while motor operation is controlled at the most efficient rotational speed for maximum fuel efficiency. All this is achieved at a greatly reduced manufacturing cost and reduced operating and maintenance cost, by a very simple construction which eliminates the multiplicity of elements required in the conventional automotive automatic transmission.

More specifically, the speed transmission unit 101 used in the transmission system according to the invention comprises substantially the same structural elements as the speed transmission unit 1 disclosed hereinabove. However, it differs from the previously disclosed unit 1 in that its countershaft pinion 21 is operatively connected to the control gear 19 through one or any odd number of intermediate gears, or chains so that the countershaft pinion 21 and the control 19 rotate in the same direction. In the embodiment shown in FIG. 6, such an operative connection is achieved with a single high torque drive belt 103.

Due to this particular connection whereby the ring 15 fixed to the control gear 19 revolve in the same direction as the sun gear 5 of the planetary system, the input power applied to the first shaft 3 by a motor engine connected thereto is split into two streams merging on the pin carrier (spider) 11, one of the streams passing through the speed variating mechanism, the countershaft 23, the belt 103, the control gear 19 and the ring gear 15 while the other stream passes directly through the sun gear 5. Of course, this configuration eliminates the possibility of reducing the output speed to zero, which is the major characteristic of the unit 1 shown in FIGS. 1 to 4. However, the unit 101 used in this second embodiment has the main advantages of providing a stepless ratio control with a very large power input and a very simple gear box.

Another main advantage of the embodiment shown in FIG. 6 is that only a small amount of power is transmitted through the speed variation mechanism thereby making the transmission system very easy to control with a very simple equipment, contrary to any standard gear box.

The first shaft 3 of the speed transmission unit 101 can be operatively connected to the motor of the vehicle through an electromagnetic powder clutch 105 as is known per se. To widen the transmission ratio span as much as possible, the second shaft 13 of the unit 101 may be connected to the driving shaft through a standard (two forward speed plus a reverse) gear box of very simple structure comprising seven simple helical gears Z1 to Z7, two jaw-clutches JC1 and JC2 and a pair of operating levers 107.

The resulting transmission system has exactly the same functions as its present counterparts. However, as aforesaid, it has a stepless ratio control contrary to its counterpart which only have a very limited number of ratio. Moreover, as its structure is much simpler, it is much less expensive.

Various examples of application will now be given.

EXAMPLE 1

Calculations were made for an industrial transmission unit as shown in FIG. 3, having the following specifications:

| | |
|---|---|
| Number of teeth of the sun gear: | 48 |
| Nuber of teeth of each planetary pinion: | 24 |
| Number of teeth on the internal surface of the ring gear: | 96 |
| Number of teeth on the external surface of the control gear: | 90 |
| Number of teeth on the countershaft pinion: | 24 |
| Speed of the drive shaft: | 1,200 RPM |

Required speed of the output shaft from 0 to 300 RPM and reverse.

Under these conditions using a speed variating mechanism as shown in FIG. 3, the following characteristics were achieved:

TABLE

| Speed of the drive shaft (RPM) | Speed of the output shaft (RPM) | Speed of the ring gear (RPM) | Speed variation ratios | Speed of the counter shaft (RPM) |
|---|---|---|---|---|
| 1200 | 295 | 159 | 2:1 | 597 |
| 1200 | 0 | 600 | 1:1.89 | 2255 |
| 1200 | −23(reverse) | 636 | 1:2 | 2390 |

The above Table shows that variations in the speed on the conical pulleys of the speed variating mechanism 25' from 2 to 1, led to corresponding variations in the speed of the output shaft of from ¼ of the drive shaft speed to 0 and then to reverse.

EXAMPLE 2

Calculations were made for a bicycle transmission unit as shown in FIG. 5.

In this example, the specifications of the unit per se were substantially identical to those given in example 1.

The specifications of the other elements were as follows:

| | |
|---|---|
| Number of teeth of driving gear on crank-gear: | 14 |
| Number of teeth of reverse gear on output shaft: | 17 |
| Number of teeth of output sprocket on driving shaft: | 14 |
| Number of teeth of rear hub sprocket: | 17 |
| Ratio of number of teeth of planetary pinion to sun gear: | 0.5 |
| Speed ratio of ring gear control system: | 1.0 |

Under such conditions, the following speed ratio characteristic were achieved:

| $i_v$ | 0.5 | 1.454 | 2.0 |

(speed radio of speed variating mechanism)

| $i_{cvt}$ | $-1.0$ | $-\frac{1}{8}$ | $-\infty$ |

(speed ratio of the transmission unit)

The total speed ratio of the bicycle (i.e. the ratio of the rotational speed np of the crank shaft to the rotational speed of the rear hub sprocket $n_w$) was as follows:

$$\text{low speed } \frac{np}{nw} = -\frac{17}{14} \times -1.0 \times \frac{17}{14} = 1.473$$

$$\text{high speed } \frac{np}{nw} = -\frac{17}{14} \times \frac{1}{8} \times \frac{17}{14} = 0.184$$

EXAMPLE 3

Calculations were made on an automatic transmission system according to the invention as shown in FIG. 6.

Figure 7:
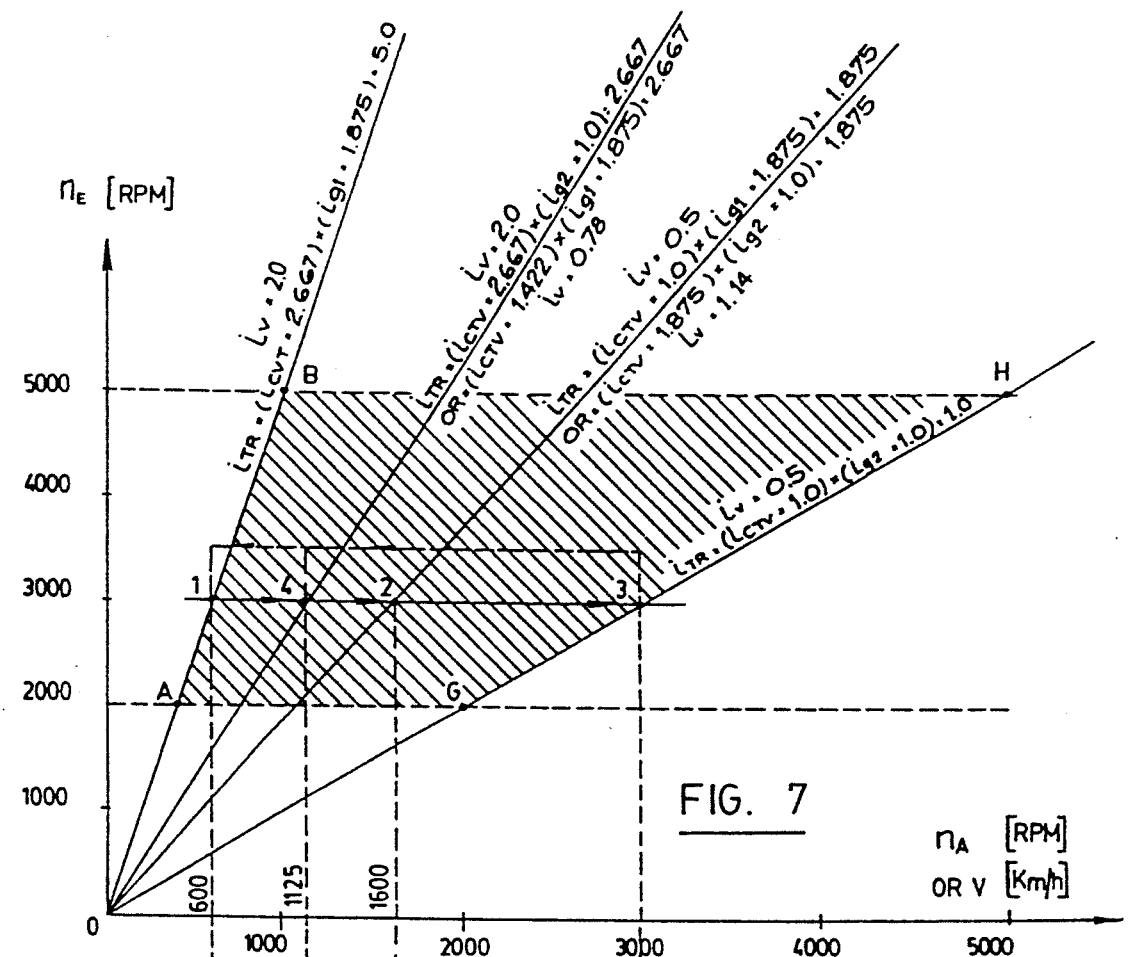
FIG. 7 is a diagram giving the speed of a motor vehicle equipped with a transmission system as shown in FIG. 6, as a function of the speed of the motor (expressed in rotations per minute)
Figure 8:
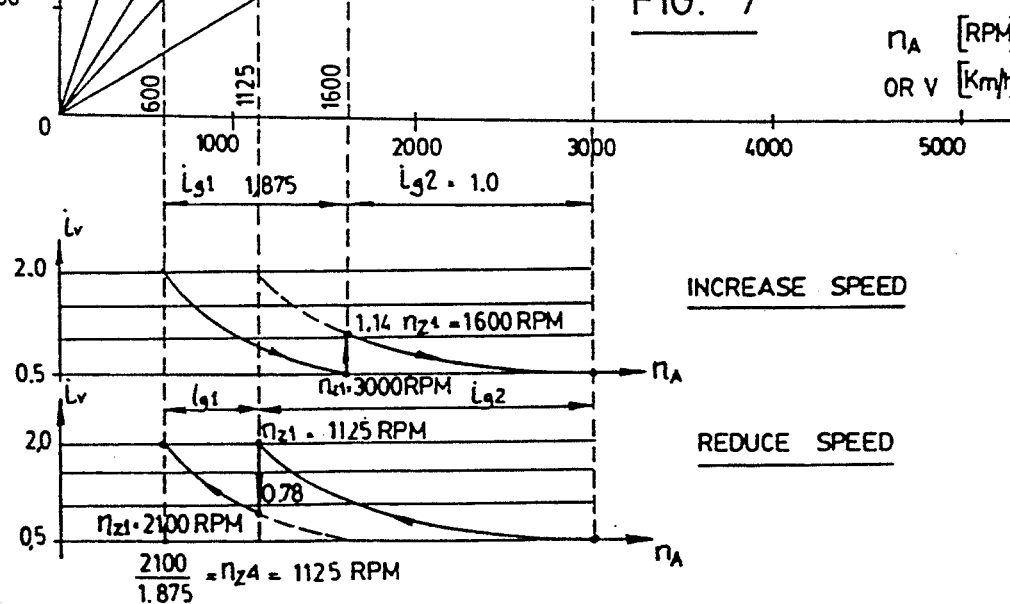
FIG. 8 is a diagram related to the one of FIG. 7, giving the value of the input speed to output speed ratio of the transmission unit as a function of the speed of the motor vehicle.

In this example as well as in FIG. 7 and 8, the symbols that are used have the following meanings:

| | | |
|---|---|---|
| $n_e$ | | engine |
| $n_d$ | | driving shaft (sun gear) |
| $n_a$ | RPM of | output shaft |
| $n_{p1}$ | | planetary gear |
| $n_{cs}$ | | counter shaft |

| | | |
|---|---|---|
| $Z_c$ | | ring gear control pulley |
| $Z_{cs}$ | | countershaft pulley |
| $Z_d$ | | drive(sun) gear |
| $Z_p$ | number of teeth or grooves on | planetary gear |
| $Z_1$ | | gears in |
| \| | | gear box |
| $Z_7$ | | incl. reverse |

$i = \text{ratio} = n_{in}/n_{out}$

| | | |
|---|---|---|
| $i_{cvt}$ | | cvt unit |
| $i_{tr}$ | | complete trans. $= i_{cvt} \times i_{g1 \text{ or } 2}$ |
| $i_{g1}$ | | gears $(Z_2/Z_1 \times Z_4/Z_3) = 1.875$ |
| $i_{g2}$ | ratio of | direct drive $= 1.0$ |
| $i_{gr}$ | | reverse $(Z_2/Z_1 \times Z_6/Z_5)$ |
| $i_c$ | | ring g. control system |
| $i_v$ | | variator |

J.C. #1 jaw clutch for $i_{g1}i_{g2}$
J.C. #2 jaw clutch for $i_{gr}$
~p control pressure for variator

PHASE I

Increase Speed (from point 1 to point 2 in FIG. 7)

Assuming that the motor speed remains constant at the most efficient level of, say, 3000 rpm and the jaw clutch J. C. #1 is engaged with gear $Z_4$ ($I_{g1}=1.875$), the following datas are obtained:

Transmission output shaft speed at point 1 is 600 rpm.
variator change: from 2.0 to 0.5
Transmission output shaft speed change: from 600 rpm to 1600 rpm.

At point 2, the fixed ratio $i_{g1}$ change from 1.875 to 1.0. Then, the throttle of the motor is partially closed but engine speed is maintained at 3000 rpm (fast idle). The jaw clutch J. C.#1 may be disengaged from gear $Z_4$ and the speed of $Z_1$ (3000 rpm) synchronized with the transmission output shaft speed $n_{A2}$ (1600 rpm), by changing the variating mechanism ratio from 0.5 to 1.14. After such a synchronization, the jaw clutch J. C.#1 may be engaged with the gear $Z_1$ (direct).

PHASE II

Increase Speed (from point 2 to point 3 of FIG. 7)

The throttle opens for 3000 rpm (under load). Then, the clutch J. C.#1 is engaged with the gear $Z_1$. By changing the variating mechanism ratio from 1.11 to 0.5, the output shaft speed $n_A$ is brought from $n_{A2}=1600$ rpm to $n_{A3}=3000$ rpm.

PHASE III

Reduce Speed

Things are happening in reverse manner. Variator ratios are changed from 0.5 to 2.0, and at point 4, the gear $Z_1$ has to be speeded up from $n_{Z1}$ (1125 rpm) to $n_{Z1}$ (2110 rpm) to allow the speed of output shaft $n_A$, in this case $n_{A4}=1125$ rpm). If $n_{Z1}=2110$ rpm;

$$n_{Z4} = \frac{2110}{1.875} = 1125 \text{ rpm.}$$

Therefore engagement of the jaw clutch J. C. #1 and gear $Z_4$ becomes possible.

What is claimed is:

1. An automotive transmission system for use in a motor vehicle, said system comprising:
   (a) an infinitely adjustable, variable speed transmission unit comprising:
   a first shaft operatively connected to the motor of said vehicle;
   a sun gear fixed to said first shaft;
   at least two planetary pinions meshed with the sun gear, said planetary pinions being freely mounted onto spindles forming part of a pinion carrier;
   a second shaft keyed to said pinion carrier, said second shaft being coaxial with the first shaft;
   a ring gear freely mounted onto said any of said first and second shafts, said ring gear extending over and meshing with said planetary pinions;
   a control gear fixed to said ring gear;
   a countershaft pinion operatively connected to said control gear through one of an odd number of intermediate gear(s), belt(s) and chain(s) so that said countershaft pinion and control gear rotate in the same direction;
   a countershaft keyed to said countershaft pinion, said countershaft extending parallel to said first shaft; and
   a speed variating mechanism mounted between the drive shaft and the countershaft to adjustably vary the relative speed of said countershaft and the first shaft; and (b) a standard, two-speed and reverse gear box directly connected to said second shaft, whereby, on the one hand, any power input applied by said motor to said first shaft is split into two streams merging on said pinion carrier and second shaft, one passing through said speed variating mechanism, countershaft and ring gear, the other directly through said sun gear, and, on the other hand, stepless ratio control is achieved with a large power input and a very simple gear box.

2. An automotive transmission system for use in a motor vehicle, said system comprising:
   (a) an infinitely adjustable, variable speed transmission unit comprising:
      a first shaft operatively connected to the motor of said vehicle;
      a sun gear fixed to said first shaft;
      at least two planetary pinions meshed with the sun gear, said planetary pinions being freely mounted onto spindles forming part of a pinion carrier;
      a second shaft keyed to said pinion carrier, said second shaft being coaxial with the first shaft;
      a ring gear freely mounted onto said any of said first and second shafts, said ring gear extending over and meshing with said planetary pinions;
      a control gear fixed to said ring gear;
      a countershaft pinion operatively connected to said control gear through one of an odd number of intermediate gear(s), belts(s) and chain(s) so that said countershaft pinion and control gear rotate in the same direction;
      a countershaft keyed to said countershaft pinion, said countershaft extending parallel to said first shaft; and
      a speed variating mechanism mounted between the drive shaft and the countershaft to adjustable vary the relative speed of said countershaft and the first shaft; and
   (b) a standard, two-speed and reverse gear box directly connected to said second shaft, whereby, on the one hand, any power input applied by said motor to said first shaft is split into two streams merging on said pinion carrier and second shaft, one passing through said speed variating mechanism, countershaft and ring gear, the other directly through said sun gear, and, on the other hand, stepless ratio control is achieved with a large power input and a very simple gear box, wherein said first shaft of said transmission unit is connected to the motor of said vehicle through an electromagnetic powder clutch and wherein said standard, two-speed and reverse gear box is of the type comprising seven gears and two jaw clutches.

3. The automotive transmission system of claim 2, wherein the speed variating mechanism comprises:
   a pair of pulleys respectively mounted onto the first shaft and the countershaft in such a manner at to extend in the same plane, at least one of said pulley consisting of a variable pitch sheave;
   an endless belt mounted onto said pulleys; and
   means for adjusting the pitch of said at least one variable pitch sheave.

4. The automotive transmission system of claim 1, wherein the ratio of the radius of the planetary pinions to the radius of the sun gear of the transmission unit is ranging between 0.3 and 0.5.

5. The automotive transmission system of claim 2, wherein the ratio of the radius of the planetary pinions to the radius of the sun gear of the transmission unit is ranging between 0.3 and 0.5.

6. The automotive transmission system of claim 3, wherein the ratio of the radius of the planetary pinions to the radius of the sun gear of the transmission unit is ranging between 0.3 and 0.5.

7. The automotive transmission system of claim 1, wherein the ratio of the radius of the planetary pinions to the radius of the sun gear of the transmission unit is equal to 0.5.

* * * * *